(No Model.) 2 Sheets—Sheet 1.
J. O. AUSTIN
Device for Sheltering Animals.
No. 235,614. Patented Dec. 21, 1880.
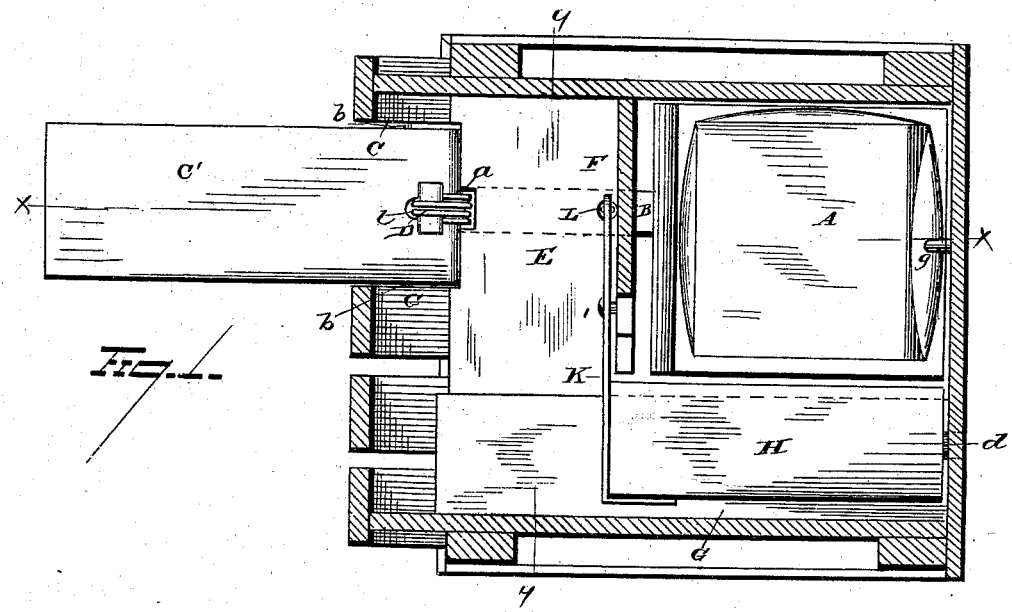
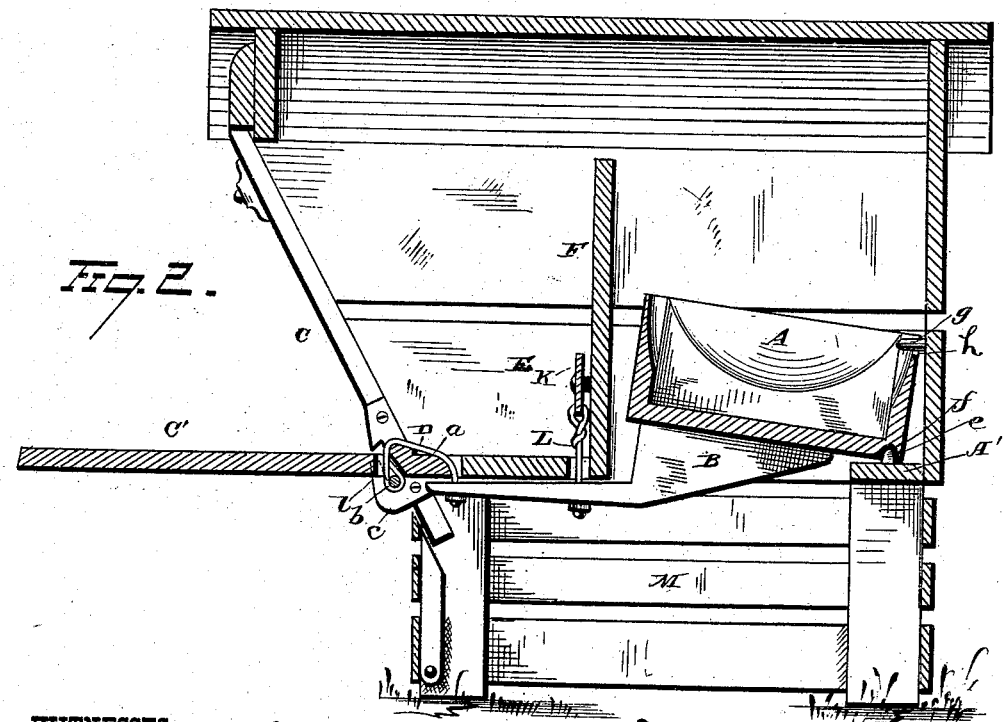
WITNESSES
E. I. Nottingham
A. Bright.
INVENTOR
J. O. Austin
By H. A. Seymour,
ATTORNEY
N. PETERS, PHOTO-LITHOGRAPHER, WASHINGTON, D. C.

(No Model.) 2 Sheets—Sheet 2.
J. O. AUSTIN
Device for Sheltering Animals.
No. 235,614. Patented Dec. 21, 1880.
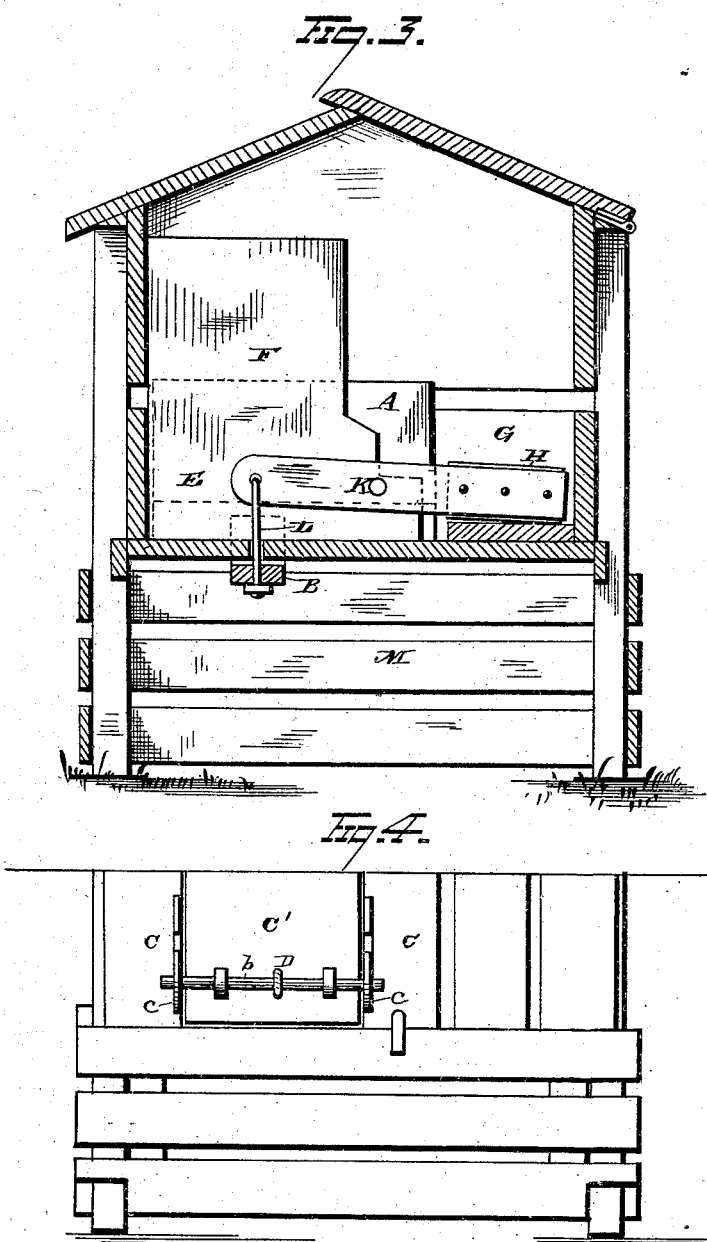
WITNESSES
INVENTOR
ATTORNEY on the tilting way, thereby depressing the latter and causing the lever, by means of the intermediate connection, to raise arm B. This action of the tilting way insures the opening of the door, so that if by any means the swinging compartment should fail to rise as the animal leaves it, the door will be suitably opened as the animal treads upon the tilting way.

It will be observed that this tilting way rests upon the floor of the passage when the door is swung down in open position; hence it is not operated or affected by the tread of the animal as the latter passes to the swinging compartment; but when the door is closed the tilting way is raised above the floor of the passage, and as the animal steps thereon the way is pressed down until it rests on the floor of the passage.

It is obvious that by making this device of any suitable size it may be employed to advantage in the different uses previously recited for it, and in each instance admirably accomplish the end in view.

It will be observed that in the form of device shown in the drawings the foregoing-described compartments are raised from the ground and supported upon a lattice-work, which forms a chicken-coop, M; but this coop may be omitted without departing from my invention.

Having fully described my invention, what I claim as new, and desire to secure by Letters Patent, is—

1. The combination, with a compartment pivoted at its rear portion to swing vertically, a horizontal arm extending forwardly therefrom, and a door-casing which inclines forwardly from bottom to top, of a door hinged at its bottom to swing vertically, and provided with an extension which projects rearwardly from its hinged line when the door is let down, and a connecting device which passes over said extension and has its ends respectively connected to the door and said horizontal arm, substantially as set forth.

2. The combination, with a vertically-swinging compartment, a horizontal arm extending therefrom, and a door hinged at its bottom to swing vertically, said door being provided with an extension which projects in horizontal line rearwardly from its hinge-line when the door is let down, of a flexible connecting device which passes over said extension and has its rear end fastened to the horizontal arm of the swinging compartment, the front end of said connecting device passing through a hole in the door and fastened to a transverse rod having its extremities journaled on opposite sides of the door and forming the hinge upon which the latter turns, substantially as set forth.

3. The combination, with a vertically-swinging compartment provided with a projecting arm, a vertically-swinging door hinged at its bottom, and intermediate connections of said arm with the door, of a tilting way located by the side of the swinging compartment, a lever projecting therefrom, and a connecting device between said arm and lever, substantially as set forth.

4. The combination, with a vertically-swinging compartment provided with an arm, a door, and intermediate connection of the latter with the arm, of a stationary compartment formed between the door and swinging compartment, a partition between the two compartments, and a passage-way which connects them, substantially as set forth.

In testimony that I claim the foregoing I have hereunto set my hand this 3d day of April, 1880.

JOHN OVERTON AUSTIN.

Witnesses:
 JONES ABERNATHY,
 JOS. P. NOBLE.

UNITED STATES PATENT OFFICE.

JOHN O. AUSTIN, OF BONHAM, TEXAS.

DEVICE FOR SHELTERING ANIMALS.

SPECIFICATION forming part of Letters Patent No. 235,614, dated December 21, 1880.

Application filed April 15, 1880. (No model.)

*To all whom it may concern:*

Be it known that I, JOHN O. AUSTIN, of Bonham, in the county of Fannin and State of Texas, have invented certain new and useful Improvements in Devices for Sheltering Animals; and I do hereby declare the following to be a full, clear, and exact description of the invention, such as will enable others skilled in the art to which it pertains to make and use it, reference being had to the accompanying drawings, which form part of this specification.

My invention relates to a device which may be adapted for use as a hen's nest, a dog-kennel, a stable for domestic animals, or for analogous purposes.

The principle of construction prevalent in all these different adaptations for use of the device consists of certain improved means for automatically closing the door as the animal steps into a vertically-swinging compartment, and for automatically opening the door as the animal leaves said swinging compartment. The device is, primarily, intended as a hen's nest, the door being automatically closed as the hen gets into her nest, so that she may be free from all intrusion while laying her egg; but when built on a larger scale it is equally capable of sheltering a horse, cow, or other domestic animal, thus permitting any one of them to automatically stable themselves against storm and cold, or shut themselves off from intrusion of the others. So, too, the device, under suitable size, is admirable as a dog-kennel, permitting the faithful house-dog to find shelter against the weather as he automatically closes the door by entering.

In the drawings, Figure 1 is a plan view, in horizontal section, of the device. Fig. 2 is a longitudinal vertical section through line $x x$ of the preceding figure. Fig. 3 is a transverse vertical section through line $y y$ of Fig. 1. Fig. 4 is a detail view, in front elevation, of the door, showing its manner of hinging.

The compartment A has its rear portion resting upon a horizontal transverse bar, A'. One or more studs, $e$, projecting upward from this bar, fit loosely in socket $f$ formed in the corresponding portion of the bottom of the compartment. These studs do not interfere with the free swinging movement of the compartment, and serve to maintain the latter in position with its rear edge bearing upon the transverse bar. A horizontal stud, $g$, projecting from the rear end of the frame, fits loosely in a vertical slot, $h$, formed in the top of the rear side of the swinging compartment, and aids to maintain the latter in position. A horizontal arm, B, extends forwardly from the bottom of the swinging compartment. A door-casing, C, inclines forwardly from its bottom to its top, and door C' is hinged at its bottom to swing vertically. The door is provided with an extension, $a$, which projects in horizontal line rearwardly from the hinge-line $b$ of the door when the latter is let down. Over this extension passes a flexible connecting device, D, having its rear end fastened to the free end of the horizontal arm B. The forward end of said connecting device passes through hole $l$ in the door, and is fastened to rod $b$, which latter is secured transversely to the outer side of the door. This rod has its extremities projecting beyond the door sides, and journaled in suitable bearings $c$, thereby forming the hinge-joint, about which the door has swinging movement in a vertical plane.

It will be observed that extension $a$ of the door serves the function of the power arm of a lever in raising the door. When compartment A is depressed the connecting device D exerts downward pressure upon said extension $a$, so that the door is swung upward in pivotal movement on rod $b$.

Between the door and the vertically-swinging compartment is a stationary compartment, E, and a vertical partition, F, separates the two compartments, so that the hen or other animal which enters the swinging compartment may not be able to see the door as it swings upward in closed position.

A passage, G, located by the side of the swinging compartment, connects the latter with the stationary compartment. Above the bottom or floor of this passage is a tilting way, H, the rear extremity of which has pivotal bearing $d$ in line with the way. The forward extremity of the tilting way is rigidly secured to one extremity of a lever, K, which latter is pivoted to partition F. A connecting device, L, depends from the opposite end of the lever to arm B.

When the animal steps out from the swinging compartment it necessarily puts its weight